3,002,055
SINGLE FILM RERECORDING SYSTEM
Olin Brittingham Gunby, Los Angeles, Calif., assignor to Radio Corporation of America, a corporation of Delaware
Filed Aug. 30, 1956, Ser. No. 607,148
4 Claims. (Cl. 179—100.2)

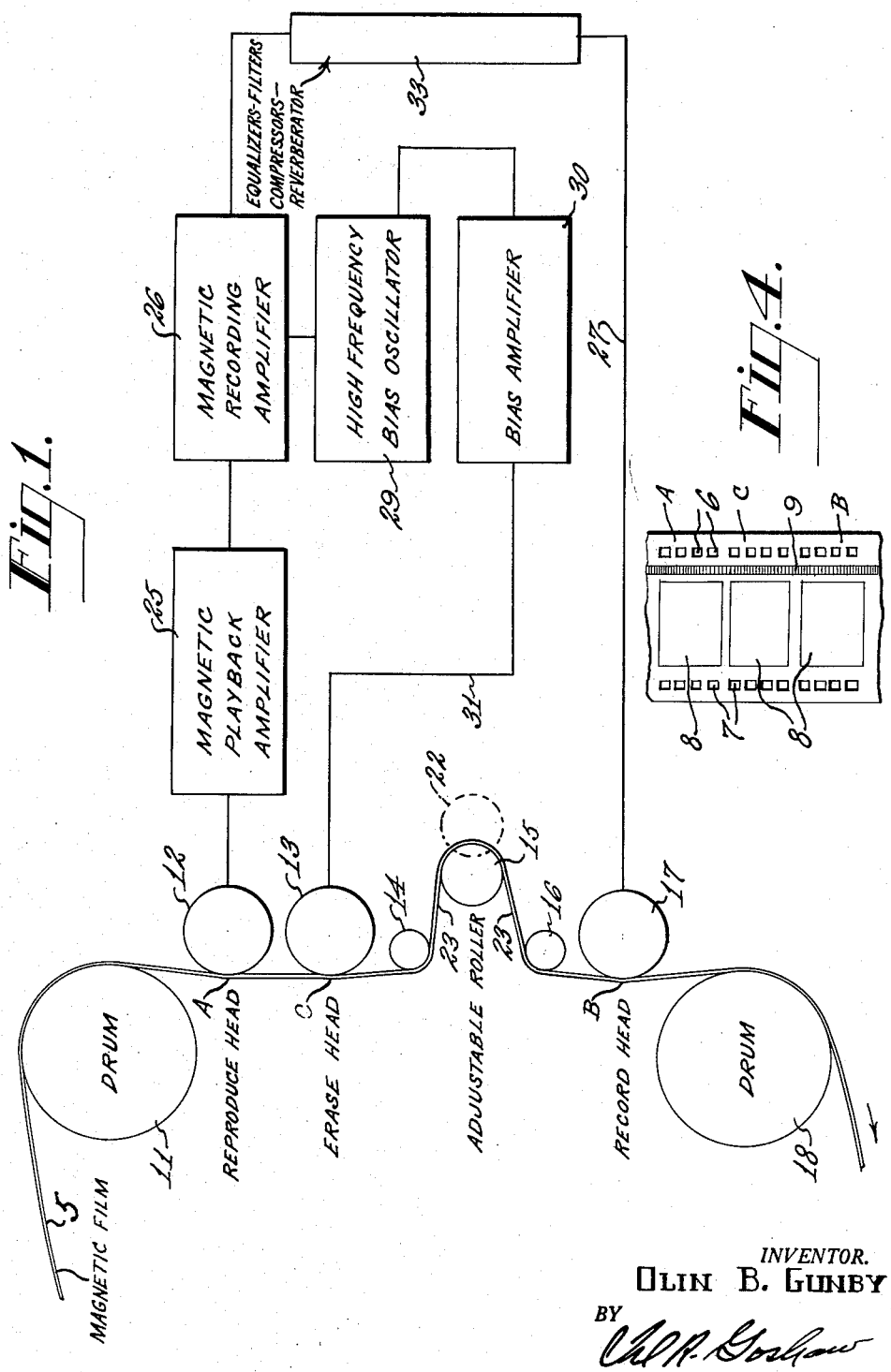

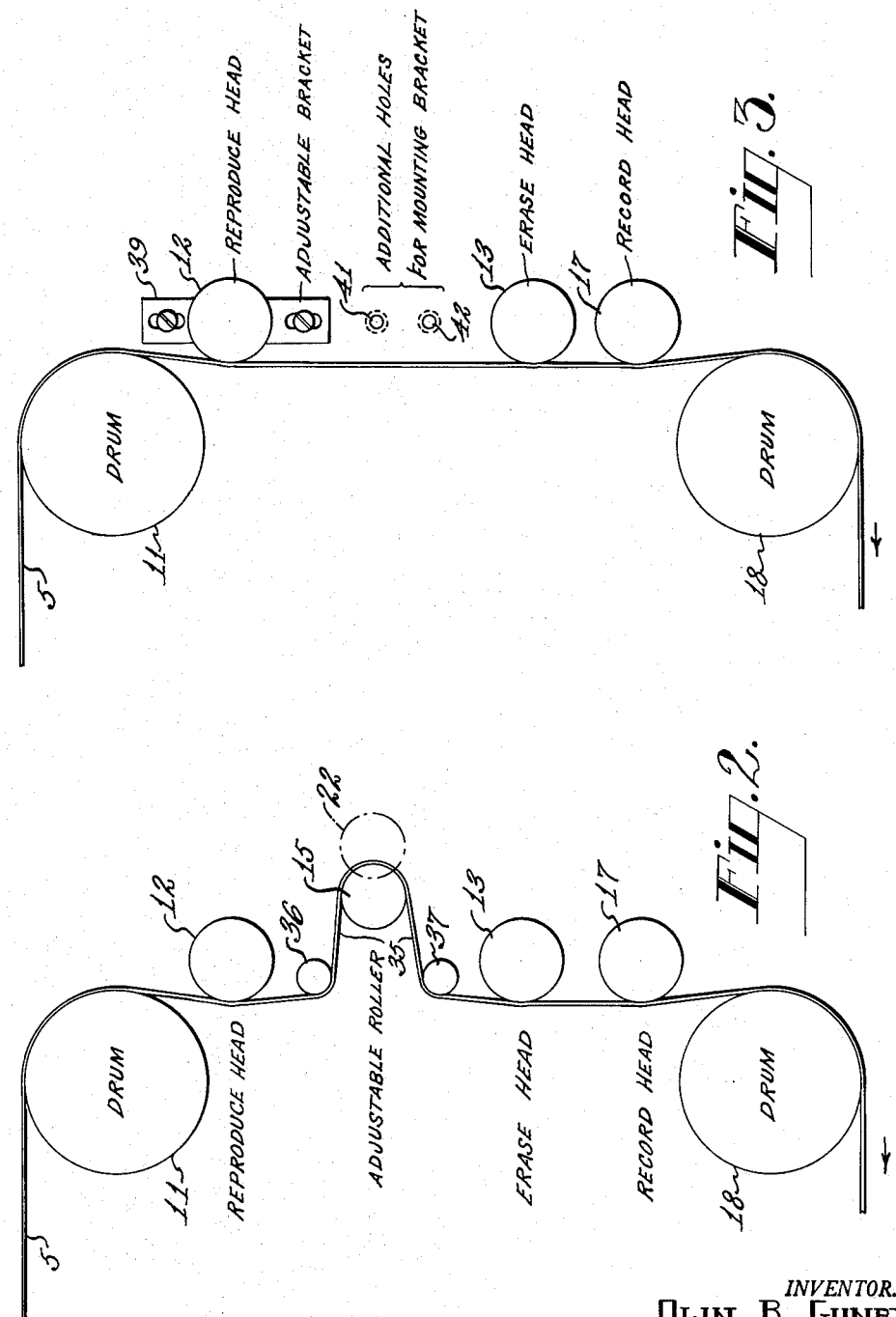

This invention relates to sound rerecording systems and particularly to a magnetic sound film rerecording system wherein the sound is rerecorded from and to the same sound film medium.

In sound motion picture production, several types of motion picture and sound recording equipments are used. In motion picture studios, where large units may be used to advantage, the picture is recorded on one film and the concomitant sound on another film either optically or magnetically. At the present time, most original recordings are made on separate magnetic films. In many newsreel cameras, which must be highly portable, the sound is recorded optically on the same film as the picture. In such portable single film equipments, the quality of the sound is usually inferior to that obtained with the studio type photographic sound recording equipment.

To improve the sound quality of single systems, photographic film is now provided with a narrow magnetic stripe, and the sound is recorder on this stripe as the picture is photographed. Thus, the advantages of magnetically recorded sound have been brought to single film portable motion picture equipment. Some of these advantages are lower background noise, higher frequency response, the ability to monitor sound from the film during the recording process, and the avoidance of making a print of the original sound track before reproducing it for television transmission.

Therefore, for television release, it is unnecessary to provide a print from the negative film, since the densities of the negative may be reversed in the television equipment. This saves time getting a newsreel "on the air" and considerable expense. Also, the present equipment does not damage the negative.

One of the problems inherent in single film picture and sound cameras involves displacement of the picture image with respect to the concomitant sound image. Different commercial projection and television equipments use different spacings between the picture and sound points which do not correspond to the spacing in the single film camera. In all photographic single film systems where it is necessary to make a print, the displacement between the sound and picture is changed during the printing operation so that the resultant prints have the picture and sound in proper synchronism for projection and reproduction on any particular equipment. Since the single film system with the magnetic stripe requires no prints to be made, the displacement between the sound and picture must be changed from what it is in the camera to be usable in certain apparatus, such as a television transmitter. The present invention is directed to a system for providing any desired displacement between the picture and its concomitant sound regardless of the original displacement thereof.

The principal object of the invention, therefore, is to facilitate the production of a motion picture sound film.

Another object of the invention is to provide an improved system for producing a motion picture sound film with any desired displacement between the picture and its concomitant sound.

A further object of the invention is to provide a magnetic sound rerecording system from and to the same film for varying the position of the sound on a magnetic stripe with respect to its picture.

A better understanding of this invention may be had from the following detailed description when read in connection with the accompanying drawings, in which:

FIG. 1 is a diagrammatic view of a rerecording system embodying the invention;

FIG. 2 is a diagrammatic view of a modification of the system shown in FIG. 1;

FIG. 3 is a diagrammatic view of another modification of the rerecording system shown in FIG. 1; and FIG. 4 is a partial view of a type of film used in the invention.

Referring to FIGS. 1 and 4, a combination photographic picture and magnetic sound film 5 has two rows of sprocket holes 6 and 7, picture image areas 8, and a magnetic stripe 9. The film shown in FIG. 4 is a standard 35 mm. with four sprocket holes per frame and the magnetic stripe 9 in the usual sound track area. The invention is also applicable to 16 mm. film having one sprocket hole per frame.

A film transport system is illustrated by a drum 11 to stabilize the motion of the film, the film 5 passing over a reproduce head 12 and an erase head 13. The film then goes over the guide roller 14, an adjustable roller 15, a guide roller 16, and then to a magnetic record head 17 and a second stabilizing drum 18. The roller 15 is adjustable perpendicularly to the direction of film travel, as shown by the broken line 22, to increase and decrease the size of the loop 23.

The reproduce head is connected to a magnetic playback amplifier 25 feeding a magnetic recording amplifier 26 which is connected over conductor 27 to recording head 17 after passing through any desired units shown in block 33. A high frequency bias oscillator 29 is connected to the recording amplifier 26 in a manner well known in the art. The high frequency oscillator is also connected to a bias current amplifier 30 which feeds erase head 13 over conductor 31. Thus, the sound signal is detected at 12, erased at 13, and rerecorded at 17.

Assuming, now, that as originally photographed and recorded, the displacement between the picture and sound is 9½ frames, 13 frames, or any other certain number of frames. However, the final displacement desired for television transmission is 22½ frames. To accomplish the change in spacing, the roller 15 is adjusted so that the sound as reproduced at point "A" is recorded at point "B," the desired number of frames farther along the magnetic stripe. For instance, if the original recording was spaced 9½ frames from the picture and a 22½ frame spacing was desired, the new recording would be 13 more frames farther along the stripe than originally recorded. Therefore, as the film 5 is transported through the rerecorder, it is reproduced at point "A," erased at point "C," and rerecorded at point B." This relationship is indicated by similar letters, "A," "B," and "C," on the film shown in FIG. 4, although the spacing is not in accordance with the example.

This rerecording operation may be done rapidly to shorten the time now required to get newsreels "on the air," and by the use of magnetic sound equipment, there will be no deterioration in the rerecorded sound. Furthermore, equalized high pass filters, low pass filters, volume compressors, variable mixer controls, reverberation equipment, and combining networks, as indicated at 33, may be employed to alter the original sound to provide an improved over-all effect. That is, the audio levels may be adjusted between different takes during the rerecording process as well as variations made in the frequency response which is desirable to provide the best sound under certain reproducing conditions. Reverberation may be added to fit the mood of the picture, while background effects and sound effects may be also mixed with the original sound recording if so desired. Thus, this system not only permits shifting the displacement between the sound as originally recorded and the picture to a different spacing, but during the process an improvement may be made in the sound signal itself.

Referring now to FIG. 2, the same units are shown at 11, 12, 13, 15, 17, and 18. However, in this modification, the erase head 13 is placed immediately prior to the record head 17, while the adjustable roller 15 forms a loop 35 between guide rollers 36 and 37. In FIG. 3, drums 11 and 18 transport the film in substantially a straight line therebetween, the adjustable roller 15 being eliminated. In this modification, the reproduce head 12 is mounted on a bracket 39, erase head 13 and record head 17 being positioned as shown in FIG. 2. By the provision of additional holes 41 and 42 on the panel for adjusting the position of reproduce head 12 with respect to record head 17, the desired displacement between picture and sound is obtained.

The above system, therefore, permits a high quality newsreel or other film to be rapidly provided with the proper displacement between picture and its concomitant sound for use in television transmission.

I claim:

1. A sound rerecording system for simultaneously detecting a sound record and recording said sound record on the same record medium comprising rollers adapted to guide a record medium having a sound record thereon from a first position to a second position, means adapted to detect said sound record at one position with respect to said medium guiding means, means adapted to erase said sound record from said medium after detection, means adapted to record said sound record on said medium after the erasing thereof, and means for connecting said detecting means and said recording means, means being included in said medium guiding means and intermediate said detection means and said recording means for varying the amount of said sound record medium between said detecting means and said recording means, said last-mentioned means being a film guiding roller between said first-mentioned rollers and adjustable to vary the length of said medium between said rollers.

2. A sound rerecording system in accordance with claim 1 in which said connecting means includes means for varying the amplitude and frequency characteristics of said sound record during transmission of said record between said detecting means and said recording means.

3. A system for varying the spacing between a picture and its concomitant sound on a single film comprising a magnetic reproduce head adapted to detect said sound, a magnetic erase head adapted to erase said sound, a magnetic record head adapted to record said detected sound, film transport means adapted to guide said film past said reproduce head, said erase head, and said record head in that order, said transport means including a pair of rollers between said erase head and said record head, and means adapted to adjust the length of the film between said reproduce head and said record head, said last-mentioned means being a roller between said pair of rollers, said rollers being adjustable substantially perpendicular to the path of said film.

4. A system in accordance with claim 3 in which interconnecting means are provided between said reproduce head and said record head, said interconnecting means including current and frequency varying devices to introduce compression and reverberation into said sound.

References Cited in the file of this patent

UNITED STATES PATENTS

| | | |
|---|---|---|
| 2,527,145 | Mitchell | Oct. 24, 1950 |
| 2,729,454 | Vides | Jan. 3, 1956 |
| 2,733,301 | Bradbury | Jan. 31, 1956 |
| 2,791,640 | Wolfe | May 7, 1957 |
| 2,804,499 | Butts | Aug. 27, 1957 |

UNITED STATES PATENT OFFICE
CERTIFICATE OF CORRECTION

Patent No. 3,002,055                      September 26, 1961

Olin Brittingham Gunby

It is hereby certified that error appears in the above numbered patent requiring correction and that the said Letters Patent should read as corrected below.

Column 1, line 27, for "recorder" read -- recorded --; line 43, after "involves" insert -- the --; column 4, line 23, for "rollers" read -- roller --.

Signed and sealed this 6th day of March 1962.

(SEAL)
Attest:

ERNEST W. SWIDER                      DAVID L. LADD
Attesting Officer                      Commissioner of Patents